(12) United States Patent
Chen

(10) Patent No.: US 6,400,398 B1
(45) Date of Patent: Jun. 4, 2002

(54) CALIBRATION METHOD FOR ALIGNING A CENTER OF A DIE ENTRANCE BUSHING WITH A CENTER OF AN INJECTION NOZZLE OF AN INJECTION MOLDING MACHINE

(76) Inventor: Shih-Fang Chen, No. 513 Pu Tzu Street, Feng Yuan City, Taichung Hsien (TW)

( * ) Notice: Subject to any disclaimer, the term of this patent is extended or adjusted under 35 U.S.C. 154(b) by 0 days.

(21) Appl. No.: 09/464,477

(22) Filed: Dec. 16, 1999

(51) Int. Cl.⁷ .................................................. H04N 7/18
(52) U.S. Cl. ........................................ 348/95; 264/40.5
(58) Field of Search ............................. 348/94–95, 61, 348/129, 180; 382/151, 287, 294; 264/40.1, 40.5; 425/149

(56) References Cited

U.S. PATENT DOCUMENTS

| | | | | |
|---|---|---|---|---|
| 3,628,901 A | * | 12/1971 | Paulson | 425/149 |
| 3,642,401 A | * | 2/1972 | Wilson | 425/137 |
| 4,069,948 A | * | 1/1978 | Saaty et al. | 222/134 |
| 4,236,181 A | * | 11/1980 | Shibata et al. | 348/130 |
| 4,841,364 A | * | 6/1989 | Kosaka et al. | 348/86 |
| 5,247,585 A | * | 9/1993 | Watanabe | 382/152 |
| 5,599,486 A | * | 2/1997 | Fujishiro et al. | 264/40.1 |
| 5,928,578 A | * | 7/1999 | Kachnic et al. | 264/40.1 |
| 5,997,778 A | * | 12/1999 | Bulgrin | 264/40.1 |

FOREIGN PATENT DOCUMENTS

| | | | | |
|---|---|---|---|---|
| JP | 63-118224 | * | 5/1988 | 425/542 |
| JP | 10-113967 | * | 5/1998 | B29C/45/76 |
| JP | 2001-225373 | * | 8/2001 | B29C/45/76 |

OTHER PUBLICATIONS

Bulgrin et al., "The application of advanced control theory to enhance molding machine performance", IEEE, Apr. 1994, pp. 94–102.*

* cited by examiner

*Primary Examiner*—Vu Le
(74) *Attorney, Agent, or Firm*—Rosenberg, Klein & Lee

(57) ABSTRACT

A calibration method is used for aligning a center of a die entrance bushing with a center of an injection nozzle of an injection molding machine, and includes the following steps: moving a camera to project an image of an injection nozzle of an injection molding machine onto a screen of the camera so as to align a center of the injection nozzle with a center of the screen; moving a die entrance bushing of a die of the injection molding machine relative to the camera to project an image of the die entrance bushing of the die onto the screen of the camera; and moving the die relative to the camera so as to align a center of the die entrance bushing with the center of the screen so that the center of the die entrance bushing aligns with the center of the injection nozzle.

5 Claims, 5 Drawing Sheets

CALIBRATION METHOD FOR ALIGNING A CENTER OF A DIE ENTRANCE BUSHING WITH A CENTER OF AN INJECTION NOZZLE OF AN INJECTION MOLDING MACHINE

BACKGROUND OF THE INVENTION

1. Field of the Invention

The present invention relates to a calibration method for precisely aligning the center of a die entrance bushing with the center of an injection nozzle of an injection molding machine.

2. Description of the Related Art

A conventional injection molding machine in accordance with the prior art shown in FIGS. 7 and 8 comprises a fixed frame 83 defining a tapered opening 84 therein, a die 80 secured to the fixed frame 83 and defining a cavity 82 therein, a die entrance bushing 81 mounted in the die 80 and connecting to the cavity 82 and the tapered opening 84, and an injection nozzle 86 secured to a feed tube 85 which is movable relative to the fixed frame 83 so that the injection nozzle 86 can be moved into the tapered opening 84 of the fixed frame 83 to contact the die entrance bushing 81 so as to inject plastic raw material contained in the feed tube 85 into the cavity 82 of the die 80. The plastic raw material may reversely flow from the die entrance bushing 81 when the center of the die entrance bushing 81 does not register the center of the injection nozzle 86. Therefore, it is important to align the center of the die entrance bushing 81 with the center of the injection nozzle 86.

A conventional calibration method in accordance with the prior art comprises providing a needle 88 on the injection nozzle 86. The feed tube 85 is then moved relative to the fixed frame 83 until the needle 88 contact the die entrance bushing 81 so as to inspect the deviation between the die entrance bushing 81 and the injection nozzle 86 by eyesight. The position of the die 80 is repeatedly adjusted so as to adjust the position of the die entrance bushing 81 for manually aligning the center of the die entrance bushing 81 with the center of the injection nozzle 86. Therefore, the operation of the conventional calibration method is not easily performed, it requires a long period of time for calibrating the center of the die of the injection molding machine. Further, an operator needs to get close to the feed tube 85 so as to calibrate the center of the die of the injection molding machine by eyesight so that the operator is easily injured by the feed tube 85 which is often very hot.

The present invention has arisen to mitigate and/or obviate the disadvantage of the conventional calibration method.

SUMMARY OF THE INVENTION

In accordance with one aspect of the present invention, there is provided a calibration method for aligning a center of a die entrance bushing with a center of an injection nozzle of an injection molding machine.

The calibration method includes the following steps: (a) moving a camera to project an image of an injection nozzle of an injection molding machine onto a screen of the camera so as to align a center of the injection nozzle with a center of the screen; (b) moving a die entrance bushing of a die of the injection molding machine relative to the camera to project an image of the die entrance bushing of the die onto the screen of the camera; and (c) moving the die relative to the camera so as to align a center of the die entrance bushing with the center of the screen so that the center of the die entrance bushing aligns with the center of the injection nozzle. The screen includes a cross coordinate mounted thereon, and a plurality of scales mounted thereon.

The calibration method further includes the step of providing at least one mark on a tapered opening of the injection molding machine so as to correct the center of the screen of the camera, wherein the tapered opening is located between the die entrance bushing and the camera.

The calibration method further includes the step of inspecting the distance between the center of the die entrance bushing and the center of the screen so that the distance is used as a distance for moving the die relative to the camera.

The calibration method further includes the step of providing a swing arm pivotally mounted on a fixed frame of the injection molding machine; and mounting the camera on the swing arm.

Further benefits and advantages of the present invention will become apparent after a careful reading of the detailed description with appropriate reference to the accompanying drawings.

DETAILED DESCRIPTION OF THE INVENTION

Figure 1:
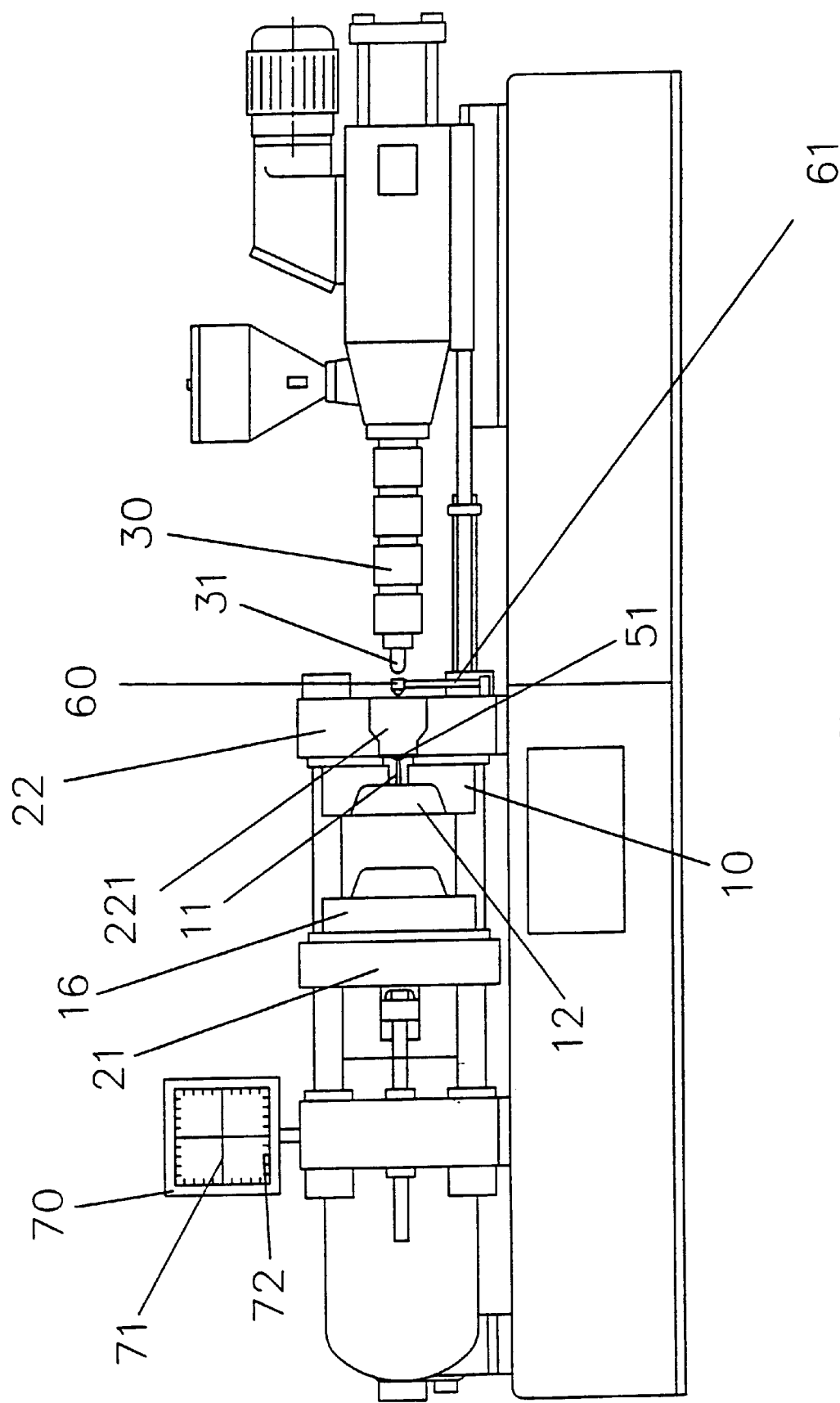
FIG. 1 is a front plan view of an injection molding machine in accordance with the present invention.
Figure 2:
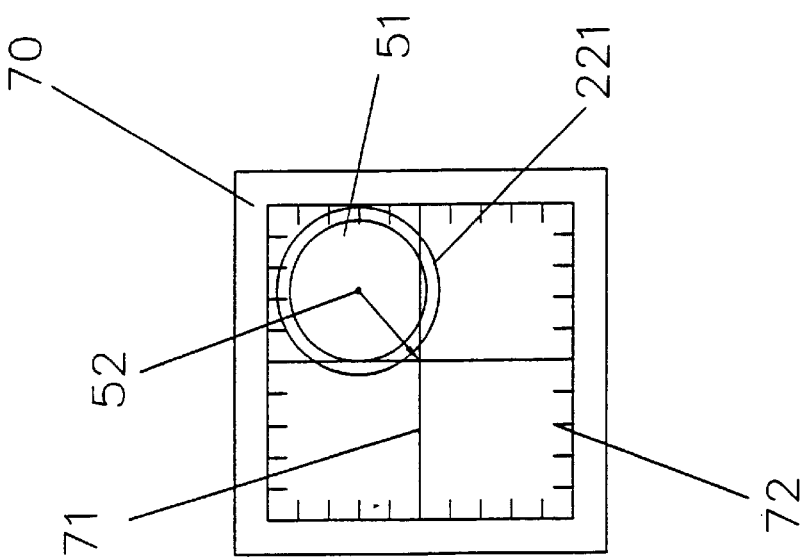
FIG. 2 is a front plan view of a screen of the injection molding machine as shown in FIG. 1.

Referring to the drawings and initially to FIGS. 1 and 2, a calibration method in accordance with the present invention is used for precisely aligning a center of a die entrance bushing with a center of an injection nozzle of an injection molding machine.

The injection molding machine comprises a fixed frame 22 defining a tapered opening 221 therein, a fixed die 10 secured to the fixed frame 22 and defining a cavity 12 therein, a die entrance bushing 11 mounted in the fixed die 10 and connecting to the cavity 12 and the tapered opening 221, a mobile die 16 secured on a slide track 21 which is movable relative to the fixed frame 22 so that the mobile die 16 is movable relative to the fixed die 10, and an injection nozzle 31 secured to a feed tube 30 which is movable relative to the fixed frame 22 so that the injection nozzle 31 can be moved into the tapered opening 221 of the fixed frame 22.

A swing arm 61 is pivotally mounted on the fixed frame 22 of the injection molding machine, a camera 60 is secured on the swing arm 61 to move therewith, and a computer screen 70 is connected to the camera 60 so that an image projected by the camera 60 can be displayed on the computer screen 70. The computer screen 70 includes a cross coordinate 71 mounted thereon, and a plurality of scales 72 mounted thereon.

Referring to FIGS. 2–6 with reference to FIG. 1, the calibration method in accordance with the present invention is described as follows.

First of all, a test paper 51 is attached to the die entrance bushing 11. The feed tube 30 is then moved relative to the fixed frame 22 until the injection nozzle 31 contacts the test paper 51. The injection nozzle 31 then injects point-shaped plastic raw material onto the test paper 51 to form a test point 52 on the test paper 51, wherein the test point 52 aligns with the center of the injection nozzle 31.

Figure 3:
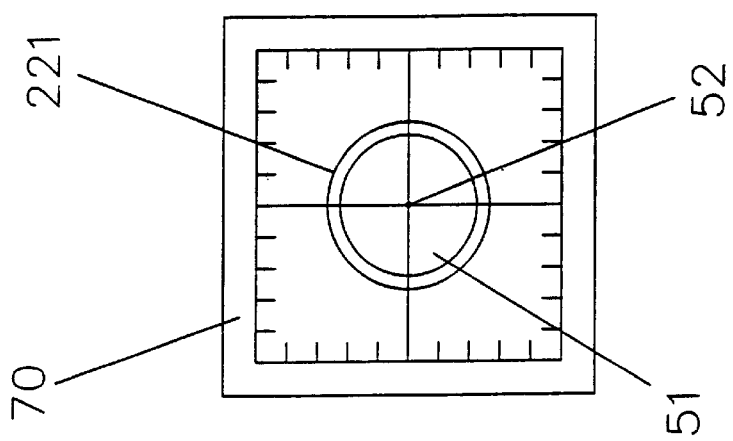
FIG. 3 is an operational view of the screen as shown in FIG. 2.

The swing arm 61 is then pivoted relative to the fixed frame 22 so that the camera 60 registers the test paper 51 to project an image of the test paper 51 together with the test point 52 onto the screen 70 of the camera 60 as shown in FIG. 2. The swing arm 61 is then slightly pivoted to move the camera 60 so as to align the test point 52 with the center of the screen 70 as shown in FIG. 3, which indicates that the center of the injection nozzle 31 aligns with the center of the screen 70.

Figure 4:
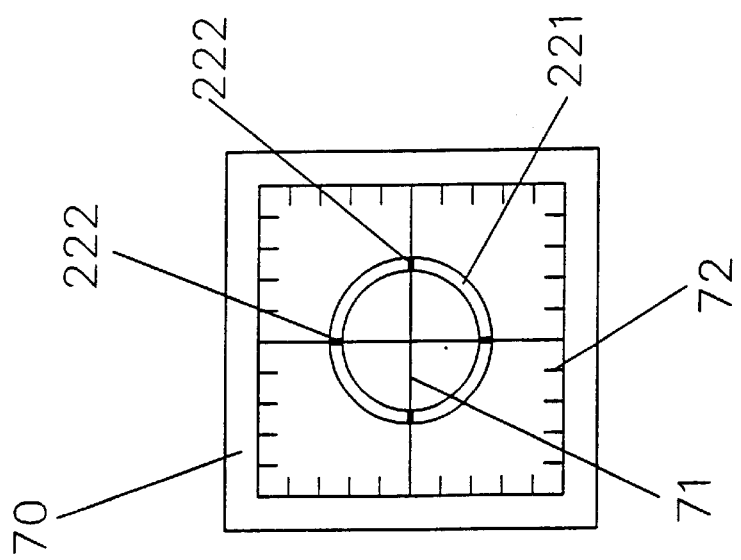
FIG. 4 is an operational view of the screen as shown in FIG. 3.

Referring to FIG. 4, the tapered opening 221 is located between the die entrance bushing 11 and the camera 60 so that the image of the tapered opening 221 is also projected on the screen 70. Accordingly, a plurality of marks 222 are printed on the tapered opening 221 of the injection molding machine. In such a manner, when the screen 70 deviates from its correct position due to the camera 60 or the swing arm 61 being vibrated or being unintentionally moved by a user, the camera 60 can be moved until the cross coordinate 71 of the screen 70 aligns with the marks 222 so as to precisely correct the center of the screen 70.

Figure 5:
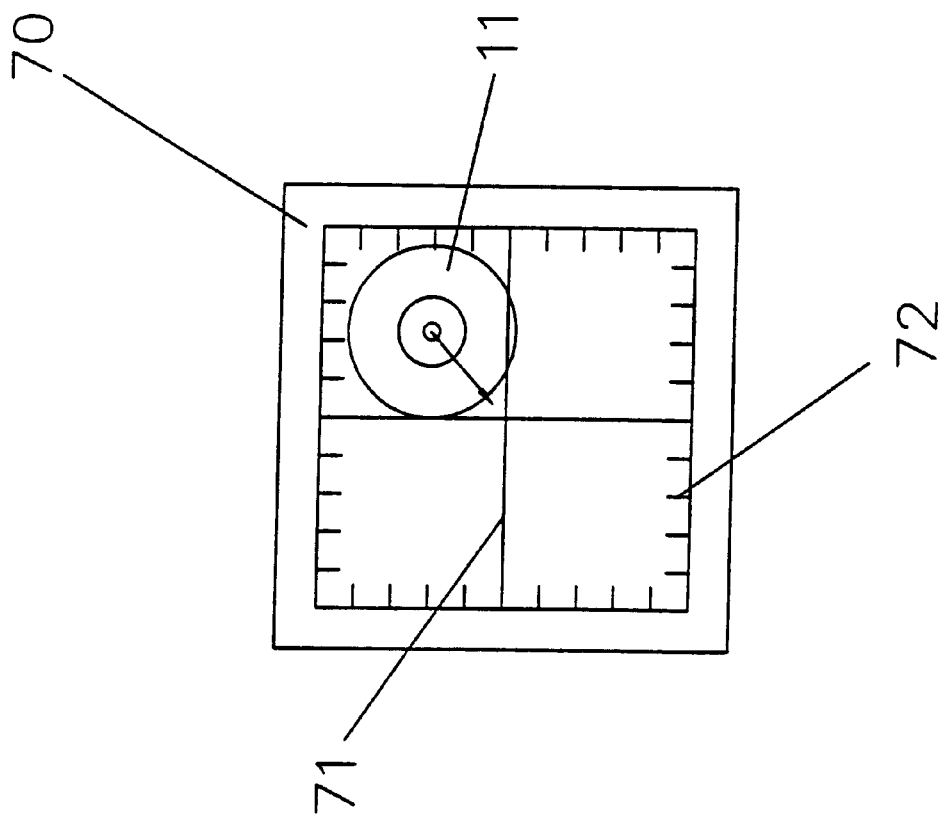
FIG. 5 is a front plans view of the screen of the injection molding machine as shown in FIG. 1.
Figure 7:
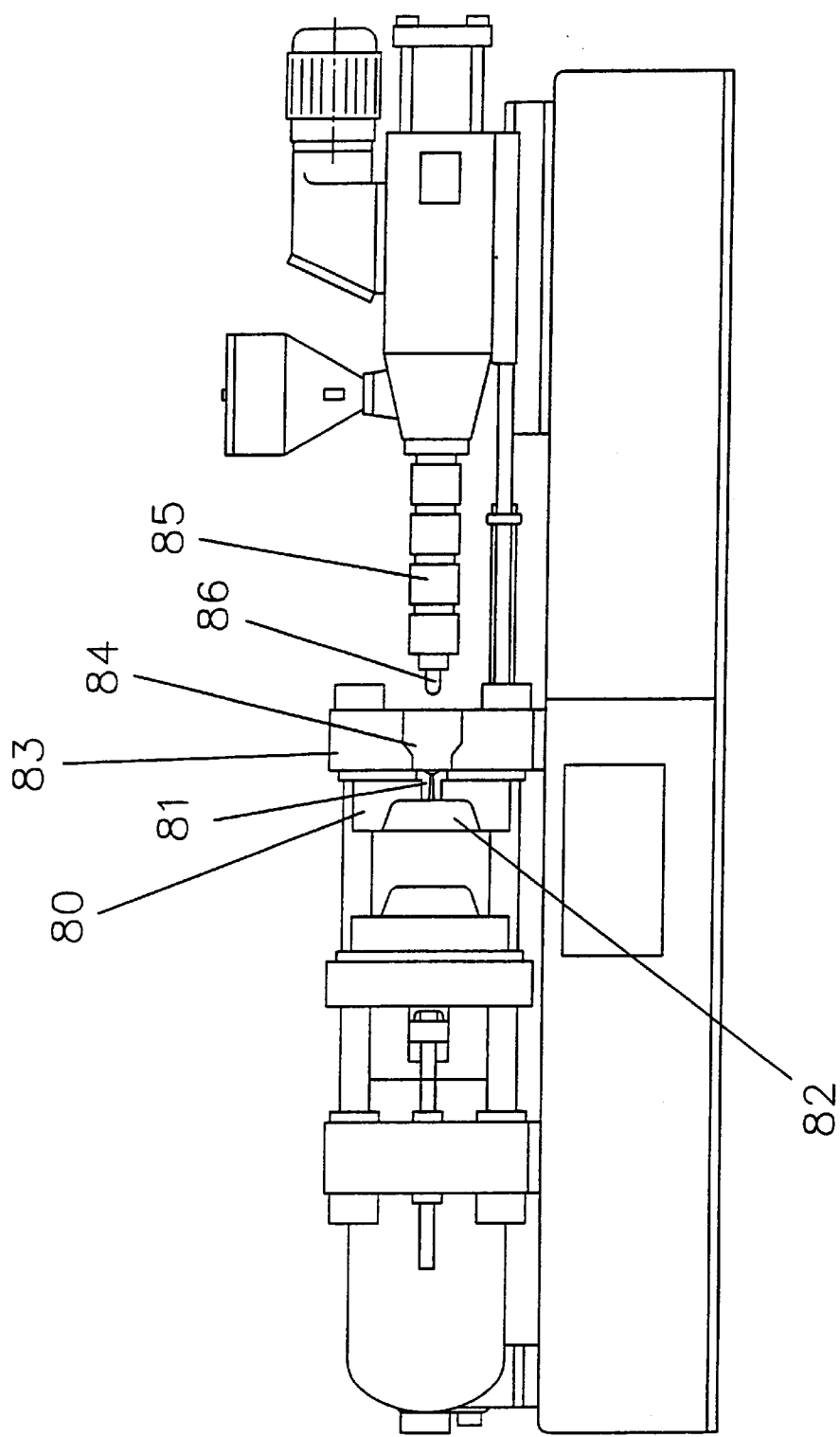
FIG. 7 is a front plan view of a conventional injection molding machine in accordance with the prior art.
Figure 8:
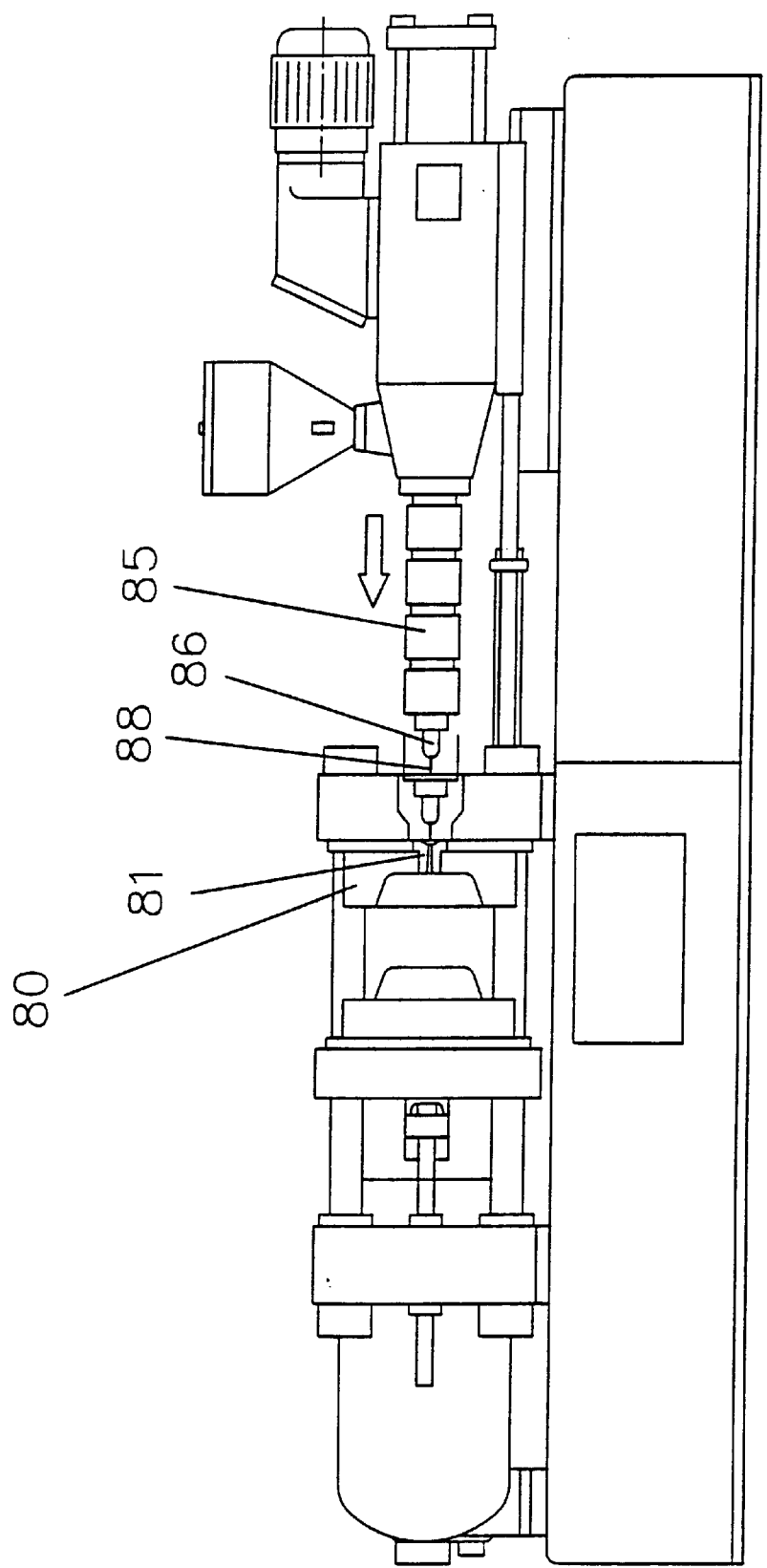
FIG. 8 is an operational view of the injection molding machine as shown in FIG. 7.

The test paper 51 is then removed from the die entrance bushing 11 which is then adjusted to register the camera 60 so as to project the image of the die entrance bushing 11 onto the screen 70 as shown in FIG. 5.

Then, the distance between the center of the die entrance bushing 11 and the center of the screen 70 is inspected by means of measuring the scales 72 on the screen 70. In such a manner, the distance is used as a reference basis for adjusting the fixed die 10 relative to the camera 60.

Figure 6:
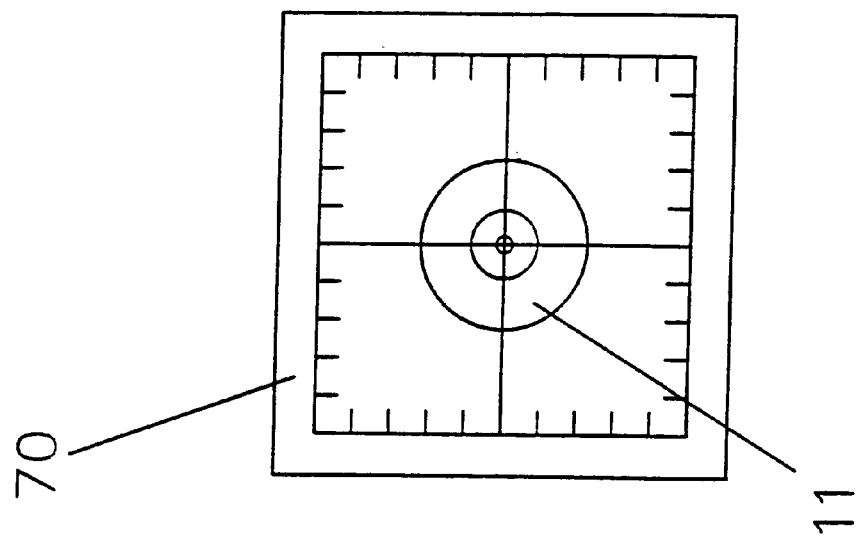
FIG. 6 is an operational view of the screen as shown in FIG. 5.

The position of the fixed die 10 relative to the camera 60 is then directly adjusted so as to align the center of the die entrance bushing 11 with the center of the screen 70 as shown in FIG. 6 so that the center of the die entrance bushing 11 aligns with the center of the injection nozzle 31.

Accordingly, the position of the die entrance bushing 11 can be directly adjusted so as to align the center of the die entrance bushing 11 with the center of the screen 70 so that the center of the die entrance bushing 11 aligns with the center of the injection nozzle 31. Therefore, the operation of the calibration method of the present invention is easily performed. In addition, the position and displacement of the die entrance bushing 11 are monitored by the screen 70 so that it is able to rapidly and precisely align the center of the die entrance bushing 11 with the center of the injection nozzle 31, thereby greatly decreasing the time for calibrating the center of the die of the injection molding machine. Further, it is unnecessary for an operator to get close to the feed tube 30 so as to calibrate the center of the die of the injection molding machine by eyesight, thereby protecting the operator from being injured by the feed tube 50 which is often very hot.

It should be clear to those skilled in the art that further embodiments may be made without departing from the scope of the present invention.

What is claimed is:

1. A calibration method for aligning a center of a die entrance bushing with a center of an injection nozzle of an injection molding machine, said calibration method comprising the following steps:

(a) moving a camera (60) to project an image of an injection nozzle (31) of an injection molding machine onto a screen (70) of said camera (60) so as to align a center of said injection nozzle (31) with a center of said screen (70);

(b) moving a die entrance bushing (11) of a die (10) of said injection molding machine relative to said camera (60) to project an image of said die entrance bushing (11) of said die (10) onto said screen (70) of said camera (60); and (c) moving said die (10) relative to said camera (60) so as to align a center of said die entrance bushing (11) with said center of said screen (70) so that said center of said die entrance bushing (11) aligns with said center of said injection nozzle (31).

2. The calibration method in accordance with claim 1, after said step (a) further comprising the step of:

providing at least one mark (222) on a tapered opening (221) of said injection molding machine so as to correct said center of said screen (70) of said camera (60), wherein said tapered opening (221) is located between said die entrance bushing (11) and said camera (60).

3. The calibration method in accordance with claim 1, after said step (b) further comprising the step of:

inspecting the distance between said center of said die entrance bushing (11) and said center of said screen (70) so that said distance is used as a distance for moving said die (10) relative to said camera (60).

4. The calibration method in accordance with, claim 1, further comprising the step of:

providing a swing arm (61) pivotally mounted on a fixed frame (22) of said injection molding machine; and mounting said camera (60) on said swing arm (61).

5. The calibration method in accordance with claim 1, wherein said screen (70) includes a cross coordinate (71) mounted thereon, and a plurality of scales (72) mounted thereon.

* * * * *